Figure 1:
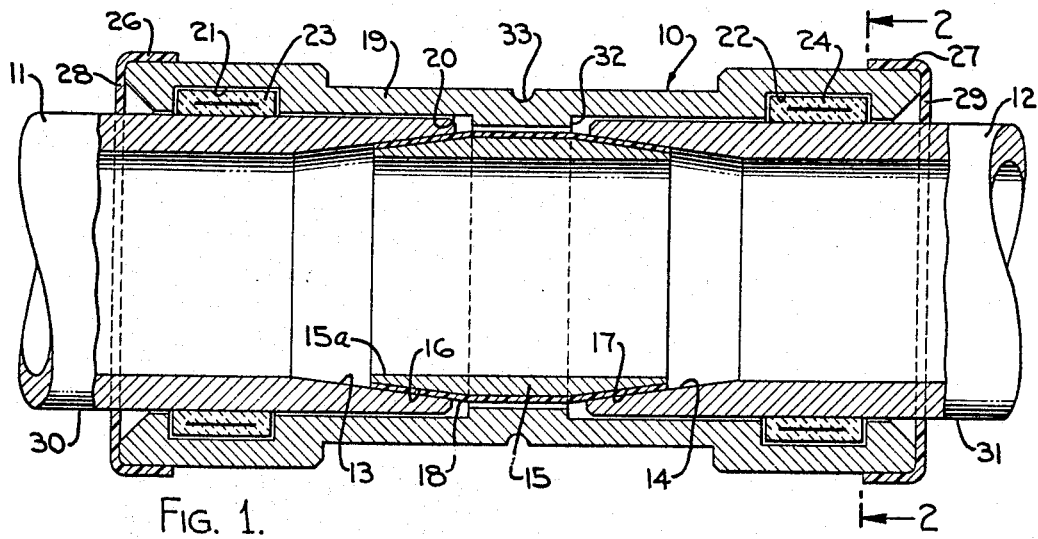

Nov. 22, 1966   L. C. MILLER   3,286,341
METHOD OF MAKING A TUBULAR JOINT
Original Filed April 5, 1962   2 Sheets-Sheet 1

LEONIDAS C. MILLER
INVENTOR.

BY  *Lyon+Lyon*

ATTORNEYS

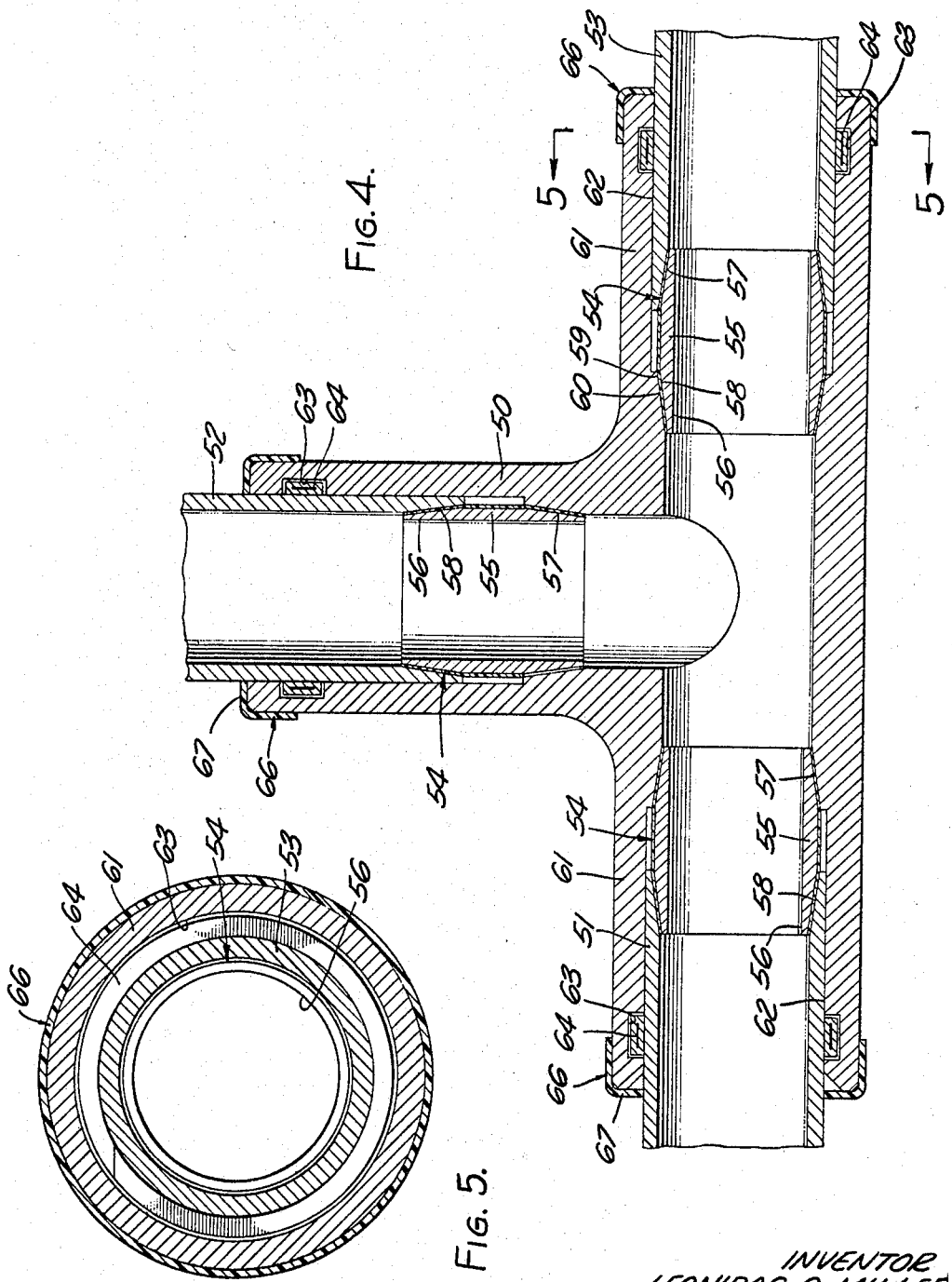

Patented Nov. 22, 1966

3,286,341
METHOD OF MAKING A TUBULAR JOINT
Leonidas C. Miller, c/o L. C. Miller Co., 717 Monterey Pass Road, Monterey Park, Calif.
Continuation of applications Ser. No. 248,727, Dec. 31, 1962, and Ser. No. 185,252, Apr. 5, 1962. This application May 26, 1965, Ser. No. 458,976
7 Claims. (Cl. 29—471.1)

This is a continuation of my copending applications Serial No. 185,252, filed April 5, 1962 and Serial No. 248,727, filed December 31, 1962, the latter being a continuation-in-part of my application Serial No. 171,389, filed February 6, 1962. These three applications are now abandoned.

This invention relates to a process for making a joint for connecting adjacent ends of tubular metal parts, or for connecting a tubular metal part to a metal fitting.

This invention is particularly directed to a process of making tubular joints of this type which is free of threaded connections and wherein leakage is positively prevented. This invention will be described in connection with making tubular joints for connecting magnesium alloy tubes, but this is by way of illustration only and not by way of limitation. Certain types of tubular magnesium alloy tubular joint connections as required in present day devices must be capable of continuous operation without leakage for periods of time as long as several years, and the joints must be capable of withstanding severe vibration in service. The problem of joining magnesium alloy parts to operate under such conditions and requirements is difficult to solve satisfactorily since threaded parts are not reliable because of the well-known characteristic of magnesium alloy in regard to notch-sensitiveness. Another important requirement in service of this type where the metal parts carry a cooling fluid is that all parts of the connection device contacted by such fluid must be constructed of subsantially the same materials to avoid undesirable galvanic corrosion.

Accordingly it is the principal object of this invention to provide a process for making a tubular joint for connecting metal tubular members end to end or for connecting a metal tubular member to a metal fitting. A more detailed object is to provide a method of making a tubular joint by melting solder to join two of the metal parts while at the same time polymerizing a plastic film between two tapered surfaces, the latter forming a barrier to prevent contact of the cooling fluid with the solder joint.

In brief, the method of making the tubular joint in accordance with this invention involves coating the externally tapered end sections of a metal ferrule with a plastic film, interposing the metal ferrule between flaring internal surfaces of two metal parts, and circling the ferrule and metal parts with a metal shell and positioning a body of solder adjacent the shell and at least one of the metal parts and applying heat for simultaneously polymerizing the film and for melting the solder and then terminating the application of heat so that a joint of polymerized plastic is formed between one of the parts and the ferrule and a solder joint is formed between the same part and the shell. Coolant which passes through the tubular joint never comes into contact with the solder. Accordingly, galvanic action is eliminated.

Other and more detailed objects and advantages will appear hereinafter.

Figure 2:
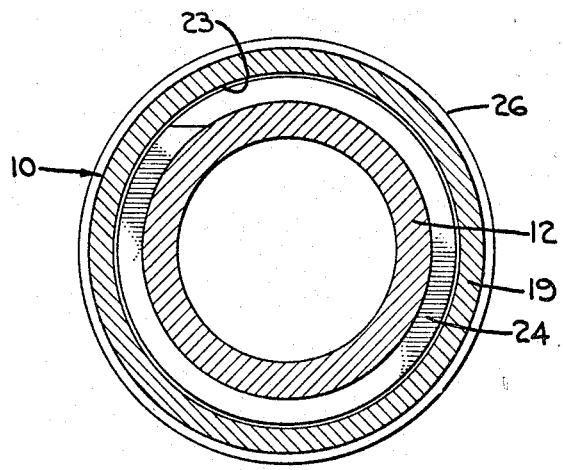

In the drawings:
FIGURE 1 is a longitudinal sectional view showing parts of a tubular joint in position prior to the heating step contemplated by this invention.
FIGURE 2 is a transverse sectional view taken substantially on the lines 2—2 as shown in FIGURE 1.

Figure 3:
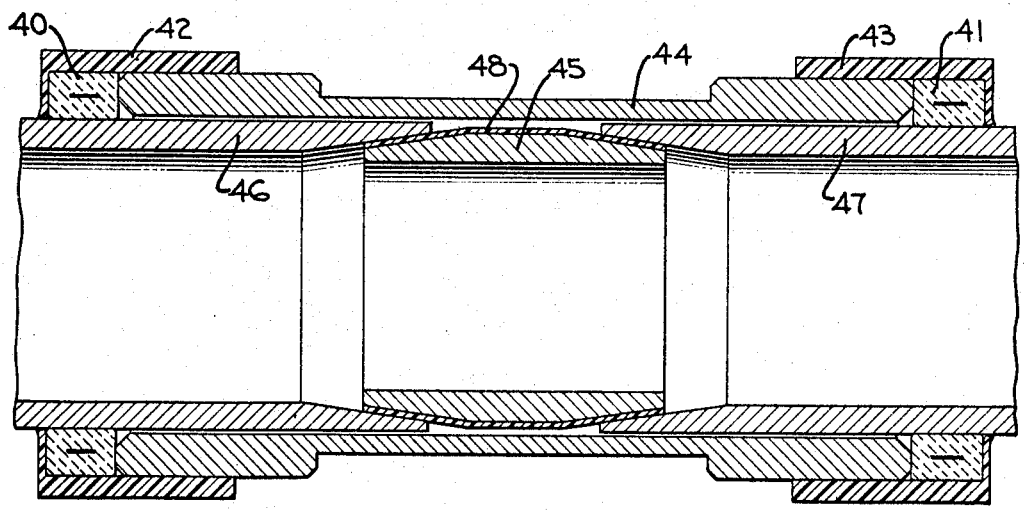

FIGURE 3 is a view similar to FIGURE 1 showing a modified form of tubular joint prior to the heating step.
FIGURE 4 is a transverse sectional elevation of another form of tubular joint prior to the heating step.
FIGURE 5 is a transverse sectional view taken substantially on the lines 5—5 as shown in FIGURE 4.

Referring to the drawings:
The tubular joint generally designated 10 and shown in FIGURES 1 and 2 of the drawings is constructed to form a fluid type connection between two aligned metal tubular members 11 and 12. Each of these tubular members is provided with a flaring bore 13, 14 at their adjacent ends. A metal ferrule 15 has a central opening 15a of approximately the same diameter as the internal diameter of the tubular members 11 and 12. The metal ferrule 15 has oppositely tapered external surfaces 16 and 17 which are received within the flaring surfaces 13 and 14.

The outer surfaces of the ferrule 15 are initially coated with a plastic film 18 which will later be subjected to heat to polymerize the material of the film and thus form a mechanical bond between the ferrule 15 and the tubular members 11 and 12.

A metal shell 19 has a central axial opening 20 and this shell encircles the ferrule 15 and also encircles a portion of each of the tubular members 11 and 12. The shell is provided with axially spaced counterbores 21 and 22 each forming an annular recess receiving a ring of solder 23, 24 respectively. The solder rings are each formed from a length of resin-core solder. The solder is first rolled to a generally rectangular cross section and then formed into a ring with mitered or bevelled ends as shown in FIGURE 2. The inner surfaces of the solder rings 23 and 24 have substantially the same diameter as the central opening 20 of the shell 19. The parts are first assembled as shown in FIGURE 1 of the drawings and while held in that position are subjected to heat such as for example by means of an induction brazing device or brazing furnace or any other suitable or desirable source of heat. The heat melts the solder and its resin core acts as a flux to assist in forming a high quality solder joint between the metal tubular members and the encircling shell 19. The same heat serves to polymerize the plastic film 18 to form a mechanical bond between the ferrule 15 and the members 11 and 12.

In order to prevent leakage of molten solder from the ends of the shell 19 during the heating operation, I provide caps 26 and 27 which are mounted over the ends of the metal shell 19 and which each have a flange 28 and 29 contacting the outer cylindrical surfaces 30 and 31 of the metal tubular members 11 and 12, respectively. The flanges 28 and 29 of these caps serve to prevent escape of molten solder and this is particularly useful when the parts are heated with the tubular joint in vertical position. The caps 26 and 27 may conveniently be formed of Teflon and stretched over the ends of the shell 19.

In a particular installation the metal tubes were formed of magnesium alloy known in the trade as AZ-31B. The ferrule 15 and shell 19 were formed of the same material. The resin-core solder melted in the temperature range of 360° F. to 375° F. and this temperature was sufficient to cause film 18 to flow and bond. When a soldering temperature in this range is used, it is preferred that film 18 comprise a nitrile-phenolic resin. For example, the nitrile-phenolic resins described in Patent No. 2,459,739 may be used. Furthermore, depending upon the soldering temperature employed, film 18 may comprise one or more of the following: polyolefins such as polyethylene and polypropylene, vinyl polymers such as polyvinyl chloride, polyesters such as polyethyleneterephthalate, polyamides, glass, ceramics, epoxy resins, polyurethanes, polybenzimidazoles and similar materials. It is also within the scope of the present invention to use a film comprising a precursor such as a prepolymer which will polymerize at the soldering temperature. For example, epoxy prepolymers may be used. In general, film 18 should be capable of flowing at the soldering temperature so as to form an impervious barrier between the interior of the tubular joint and solder 23, 24.

Additional benefits are obtained if film 18 is strongly adhesive, but materials having relatively poor adhesive properties, e.g., polyethylene, may be used with sucess in the present invention.

The tubular members 11 and 12 are provided with a coating known in the trade as DOW 7 and which is corrosion resistant. In order to provide optimum surfaces for the solder joints, this DOW 7 coating is first stripped from the outer surface of the tubular members, near the ends thereof. The stripped areas are then plated with zinc, copper and tin to form a very thin plated area for solder contact. A film sleeve is then installed over the outer surface of the ferrule 15 and the ferrule as thus coated was placed into position between the flared ends of the tubular members 11 and 12. After the heating operation the joint proved to be absolutely fluid tight and able to withstand severe vibration without leaking.

A central internal rib 32 may be provided on the shell 19 to form an abutment to engage the end of either of the tubular members 11 or 12 and thus centralize the shell 19 with respect to the ferrule 15 and the tubular members 11 and 12. In certain installation where it is essential to slide the shell 19 axially into position over only one of the tubes for purposes of assembly, this rib 32 is omitted. If desired, a small groove 33 may be provided on the shell 10 to indicate the presence of the internal rib 32.

This invention may be used with tubes formed of aluminum alloy, steel, or bi-metal construction such as steel lined with stainless steel. In the latter case silver solder would be employed, and a high temperature bonding material such as a ceramic coating would be applied to the sealing surfaces of the ferrule. The flow temperature of the silver solder alloy would be in the range of the bonding temperature of the ceramic coating.

The modified form of the device shown in FIGURE 3 of the drawings does not have the axially spaced counterbores 21 and 22, and instead the solder rings 40 and 41 are initially held in place by means of the Teflon caps 42 and 43 which encircle the ends of the metal shell 44. The metal ferrule 45 is joined to the tubular members 46 and 47 in the manner described above. The same heating operation that joins the ferrule coating 48 to the tubular members 46 and 47 also serves to melt the solder rings 40 and 41 to form a solder joint between the shell 44 and the tubular members 46 and 47.

If desired, addditional solder may be hand-fed into the joint between the shell and the tubular members, in either of the forms of the invention illustrated, in order to fill all space between the shell and tubular members more completely.

In the modified form of tubular joint shown in FIGURES 4 and 5, the T-fitting 50 is connected to each of three metal tubes 51, 52 and 53 by means of tubular connections generally designated 54. Since each of these tubular connections are identical, only one need be described.

The tube 53 is provided with a flaring bore 54 near its end, and a metal ferrule 55 has a central opening 56 of approximately the same diameter as the internal diameter of the tube 53. The metal ferrule 55 is provided with oppositely tapered external surfaces 57 and 58. The tapered surface 57 is received within the flaring surface 54 on the tube 53, and the tapered surface 58 is received within the taper bore 59 on the member 50. The outer surfaces of the ferrule 55 are initially coated with a plastic film 60, and the parts are later heated to form a mechanical bond between the ferrule 55 and the member 50 by polymerization of the plastic film 58.

The metal fitting 50 has a cylindrical tubular portion 61 provided with a central opening 62, and this tubular portion encircles the ferrule 55 and also encircles a portion of the tube 53. The cylindrical portion 61 is provided with a counterbore 63 forming an annular recess which receives a ring of solder 64. The solder ring 64 is formed from a length of resin core solder. The solder is first rolled into a generally rectangular cross section and then formed into a ring with mitered or bevelled ends as shown in FIGURE 2. The inner cylindrical surface of the solder ring 64 has substantially the same diameter as the central opening 62 in the cylindrical portion 61 of the metal T-fitting 50.

The parts are first assembled as shown in FIGURE 1 of the drawings, and then are subjected to heat such as, for example, by means of an induction heating device or brazing furnace or any other suitable or desirable source of heat. The heat melts the solder and its resin core acts as a flux to assist in forming a high quality solder joint between the metal fitting 50 and the metal tubes 51, 52 and 53. The same heat serves to polymerize the plastic film 58 to form the mechanical bond between the ferrules 55 and the tubes and fitting 50.

Teflon caps 66 each having flanges 67 are stretched over the ends of the fitting and serve to prevent escape of molten solder, as described above. The materials and the heat ranges employed are the same as described above.

Having fully described my invention, it is to be understood that I am not limited to the details herein set forth but that my invention is of the full scope of the appended claims.

I claim:

1. A process comprising aligning a pair of metal tubular members each having an end portion provided with a flaring internal surface, interposing a metal ferrule having a central bore between said tubular members, the ferrule having opposite end sections each provided with an external tapered surface adapted to seat within said flaring internal surfaces of the tubular members, positioning a plastic film between said ferrule surfaces and said flaring surfaces of said tubular members, encircling the ferrule and said end portions of said tubular members with a metal shell, positioning a body of solder adjacent the shell and each of said tubular members whereby an assembly is formed, said solder and said plastic film having a fusion temperature in substantially the same range and heating said assembly to a temperature sufficient to fuse said solder and said plastic film.

2. A process comprising aligning a pair of metal tubular members each having an internally tapered end portion, interposing a metal ferrule having a central portion between said tubular members, the ferrule having externally tapered opposite end sections which seat within said end portions, positioning a film comprising a member selected from the group consisting of polymeric material, glass and ceramic between said end portions and said end sections, encircling said ferrule and said end portions of said tubular members with a metal shell, positioning a body of solder adjacent the shell and each of said tubular members whereby an assembly is formed, said solder and said film having a fusion temperature in substantially the same range, and heating said assembly to a temperature sufficient to cause said solder and said film to fuse.

3. The process of making a joint connecting a metal tube to a metal shell, comprising: forming a flaring internal surface on an end portion of the tube, positioning a metal ferrule having a central bore and having an end section externally tapered and coated with a material selected from the group consisting of polymeric material, glass and ceramic, so that the tapered and coated section of the ferrule extends into and seats within the flaring surface of the tube, encircling the ferrule and end portion of the tube with a metal shell, positioning a body of solder adjacent the shell and the tube, whereby an assembly is formed, and heating the assembly to a temperature sufficient to melt the solder and to cause the material to form a bond, whereby upon cooling of the assembly a joint of said material is formed between the ferrule and said tube and a solder joint is formed between the tube and the shell.

4. The process of making a joint connecting aligned metal tubes, comprising: forming a flaring internal surface on end portions of the tubes, interposing between said tubes a metal ferrule having a central bore and having opposite end sections externally tapered and coated with a polymerizable plastic material, so that the tapered and coated sections of the ferrule extend into and seat within the flaring surfaces of the tubes, encircling the ferrule and end portions of the tubes with a metal shell, positioning a body of solder adjacent the shell and each of the tubes, whereby an assembly is formed, and heating the assembly to a temperature sufficient to melt the solder and to polymerize the plastic material, whereby upon cooling of the assembly a polymerized plastic joint is formed between the ferrule and each of said tubes and a solder joint is formed between each of said tubes and the shell.

5. The process of making a joint connecting aligned magnesium-alloy tubes, comprising: forming a flaring internal surface on end portions of the tubes, interposing between said tubes a magnesium-alloy ferrule having a central bore and having opposite end sections externally tapered and coated with a polymerizable plastic material, so that the tapered and coated sections of the ferrule extend into and seat within the flaring surfaces of the tubes, encircling the ferrule and end portions of the tubes with a magnesium-alloy shell, positioning a body of solder adjacent the shell and each of the tubes, whereby an assembly is formed, and heating the assembly to a temperature sufficient to melt the solder and to polymerize the plastic material, whereby upon cooling of the assembly a polymerized plastic joint is formed between the ferrule and each of said tubes and a solder joint is formed between each of said tubes and the shell.

6. The process of making a joint connecting a metal tube to a metal shell, comprising: forming a flaring internal surface on an end portion of the tube, forming a flaring internal surface within the metal shell at a location spaced inwardly from an end of the shell, interposing between said tube and said shell a metal ferrule having a central bore and having opposite end sections externally tapered and coated with a polymerizable plastic material, so that the tapered and coated sections of the ferrule extend into and seat within the flaring surfaces of the tube and the shell, the tube extending into the interior of the shell from said end of the shell, positioning a body of solder adjacent the shell and the tube, whereby an assembly is formed, and heating the assembly to a temperature sufficient to melt the solder and to polymerize the plastic material, whereby upon cooling of the assembly a polymerized plastic joint is formed between the ferrule and the tube and between the ferrule and the shell, and a solder joint is formed between the tube and the shell.

7. The process of making a joint connecting a magnesium-alloy tube to a magnesium-alloy shell, comprising: forming a flaring internal surface on an end portion of the tube, forming a flaring internal surface within the magnesium-alloy shell at a location spaced inwardly from an end of the shell, interposing between said tube and said shell a magnesium-alloy ferrule having a central bore and having opposite end sections externally tapered and coated with a polymerizable plastic material, so that the tapered and coated sections of the ferrule extend into and seat within the flaring surfaces of the tube and the shell, the tube extending into the interior of the shell from said end of the shell, positioning a body of solder adjacent the shell and the tube, whereby an assembly is formed, and heating the assembly to a temperature sufficient to melt the solder and to polymerize the plastic material, whereby upon cooling of the assembly a polymerized plastic joint is formed between the ferrule and the tube and between the ferrule and the shell, and a solder joint is formed between the tube and the shell.

References Cited by the Examiner

UNITED STATES PATENTS

| | | | |
|---|---|---|---|
| 693,830 | 2/1902 | Burke. | |
| 1,935,425 | 11/1933 | Wiggins. | |
| 2,125,324 | 8/1938 | Williams et al. | 29—491 X |
| 2,333,343 | 11/1943 | Spndzimir. | |
| 2,492,162 | 12/1949 | Lilton. | |
| 3,032,870 | 5/1962 | Rohrberg | 29—503 X |
| 3,107,421 | 10/1963 | Turnbull | 29—471.1 |

JOHN F. CAMPBELL, *Primary Examiner.*